United States Patent [19]

White, Jr.

[11] Patent Number: 4,984,645
[45] Date of Patent: Jan. 15, 1991

[54] VEHICLE AND POWERTRAIN THEREFOR FOR USE BY CHILDREN

[76] Inventor: John A. White, Jr., 5249 Spinning Wheel Ct., Grand Blanc, Mich. 48439

[21] Appl. No.: 410,422

[22] Filed: Sep. 21, 1989

[51] Int. Cl.$^5$ ............................................. B60K 1/00
[52] U.S. Cl. .................................. 180/65.6; 180/210; 180/343; 180/349; 180/370; 180/374; 180/385; 180/298; 280/62; 280/79.2; 74/512; 74/530; 192/1.57; 192/1.61
[58] Field of Search ................. 180/21, 210, 342, 343, 180/344, 349, 370, 374, 383, 385, 65.6, 298; 280/62, 79.2; 192/1.61, 1.57, 1.56; 74/512, 530

[56] References Cited

U.S. PATENT DOCUMENTS

| | | | |
|---|---|---|---|
| 2,869,384 | 1/1959 | Schmitter | 74/420 |
| 2,917,122 | 12/1959 | Quisenberry | 180/65.6 |
| 2,968,188 | 1/1961 | DuShane | 74/375 |
| 3,344,553 | 10/1967 | Taggart | 180/370 |
| 3,684,046 | 8/1972 | Begleiter | 180/65.6 |
| 4,399,883 | 8/1983 | Todokoro | 180/65.6 |
| 4,412,828 | 11/1983 | Darby | 474/81 |
| 4,418,784 | 12/1983 | Fox | 180/221 |
| 4,475,618 | 10/1984 | Kennedy et al. | 180/65.6 |
| 4,484,649 | 11/1984 | Kennedy et al. | 180/65.6 |

FOREIGN PATENT DOCUMENTS 0025960 4/1981 European Pat. Off. .
1405427 3/1959 Fed. Rep. of Germany .
1545485 5/1979 United Kingdom .

Primary Examiner—Charles A. Marmor
Assistant Examiner—Tamara L. Finlay
Attorney, Agent, or Firm—Shlesinger & Myers

[57] ABSTRACT

A vehicle comprises a main frame, a pair of front wheels and at least a rear wheel operably associated with the frame for engagement with the ground, a steering mechanism, a seat associated with the frame for an operator, an engine including a drive shaft, a device for mounting the engine to the main frame, and a torque converter operably associated with the drive shaft and the rear wheel. The mounting device has a first position whereby the drive shaft is in driving engagement with the torque converter and a second position whereby the drive shaft is in disengagement from the torque converter. The mounting device includes a brake mechanism for stopping the vehicle and having operative and non-operative positions such that when the brake mechanism is in the non-operative position, the drive shaft is in the first position and when the brake mechanism is in the operative position, the drive shaft is in the second position.

16 Claims, 2 Drawing Sheets

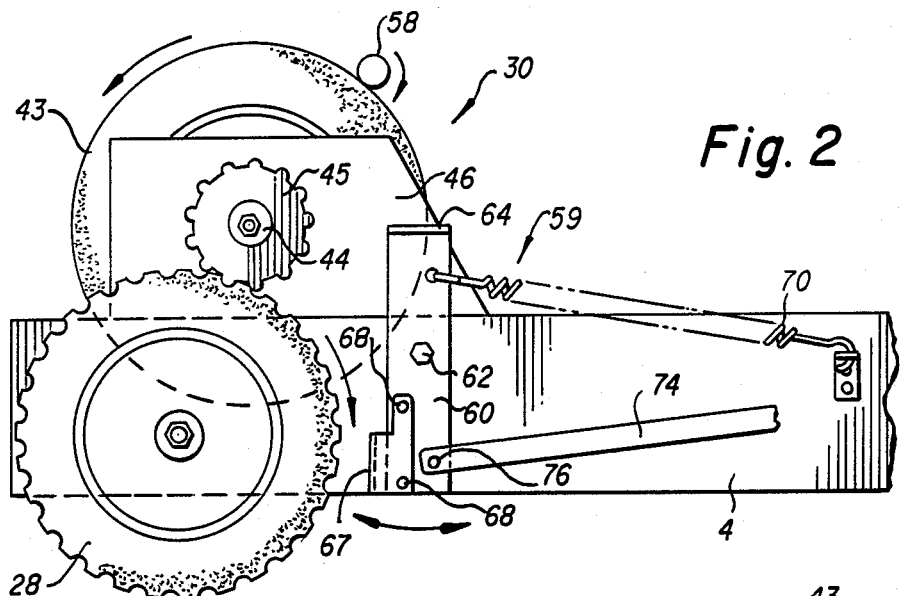
Fig. 2
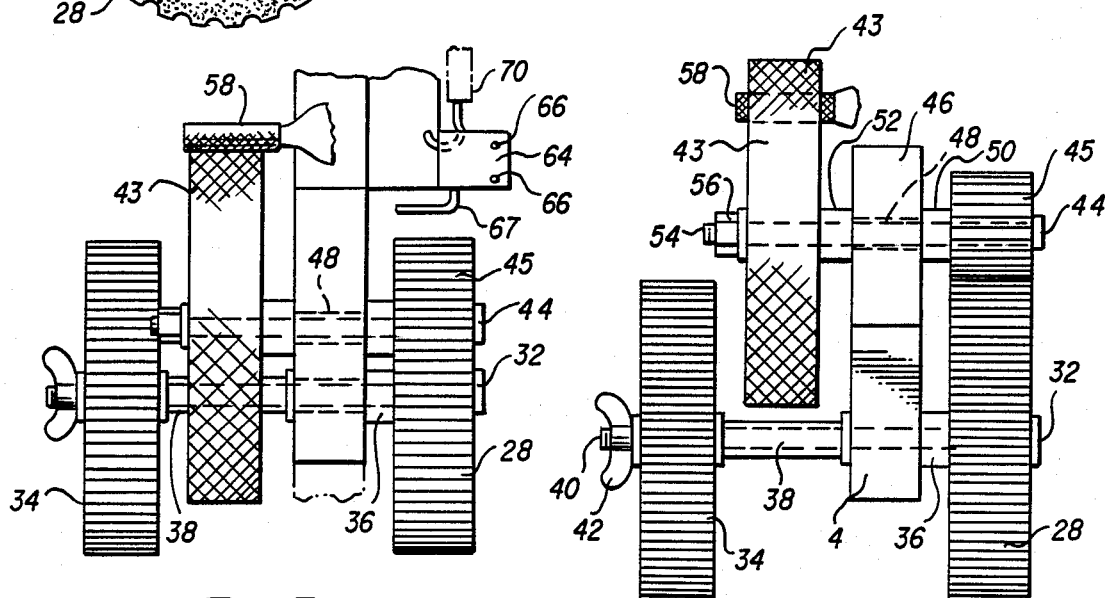
Fig. 3
Fig. 4
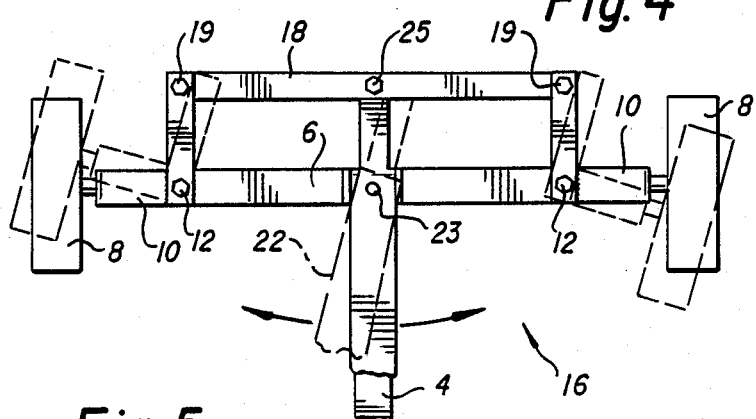
Fig. 5

VEHICLE AND POWERTRAIN THEREFOR FOR USE BY CHILDREN

FIELD OF THE INVENTION

The present invention relates generally to a vehicle and in particular to a vehicle for use by children.

BACKGROUND OF THE INVENTION of vehicles.

The first category is designed for young children between the ages of 3 and 5 years. The second category of vehicles is designed for older children between 12 to 18 years of age. A category of vehicles for children between the ages of 6 to 12 years is lacking because a suitable powertrain which provides a safe drive means is not available.

The first category of vehicles is typically powered with a low horsepower (less than 0.25 hp) electric motor. The low power provides a safe powertrain for young children. On a level ground, this type of vehicle with a child typically weighing less than 75 pounds will achieve a speed of less than 3 mph.

The second category of vehicles is generally powered by engines that exceed 3 hp. Payload weight limits present no problem. However, they are heavy and have relatively high performance. It is difficult for young children to operate this type of vehicle safely. This type of vehicle requires operation in low traffic areas for safety reasons; however, due to its heavy weight, transport to these areas is often difficult.

In view of the above, it is seen that there is a need for a type of vehicle which is suitable for children, particularly in the age range of 6-12 years.

OBJECTS AND SUMMARY OF THE INVENTION

It is therefore an object of the present invention to provide a vehicle which is safe for use by children, particularly for children in the 6-12 years age group.

It is another object of the present invention to provide a power train for use in a vehicle intended for young children.

It is still another object of the present invention to provide a vehicle which automatically applies a braking force to the vehicle when the powertrain is disengaged.

It is yet another object of the present invention to provide a vehicle which utilizes a high rpm, low torque and low horsepower engine.

It is a further object of the present invention to provide a vehicle which provides a maximum speed of under 25 miles/hour.

It is still another object of the present invention to provide a vehicle which is lightweight and compact for ease of portability.

It is an object of the present invention to provide a vehicle which is relatively inexpensive to manufacture.

It is another object of the present invention to provide a vehicle which utilizes readily available parts.

It is still another object of the present invention to provide a vehicle which has relatively few parts.

In summary, the present invention provides a vehicle and a powertrain therefor for safe operation by young children.

These and other objects of the present invention will become apparent from the following detailed description.

BRIEF DESCRIPTIONS OF THE DRAWINGS

FIG. 2 is an enlarged, fragmentary, side elevational view of a powertrain according to the present invention.

FIG. 3 is a fragmentary top plan view of FIG. 2.

FIG. 4 is a fragmentary rear elevational view of FIG. 2.

FIG. 5 is a fragmentary top plan view of the steering mechanism used in the vehicle.

DETAILED DESCRIPTION OF THE INVENTION

FIGS. 1 and 5

Figure 1:
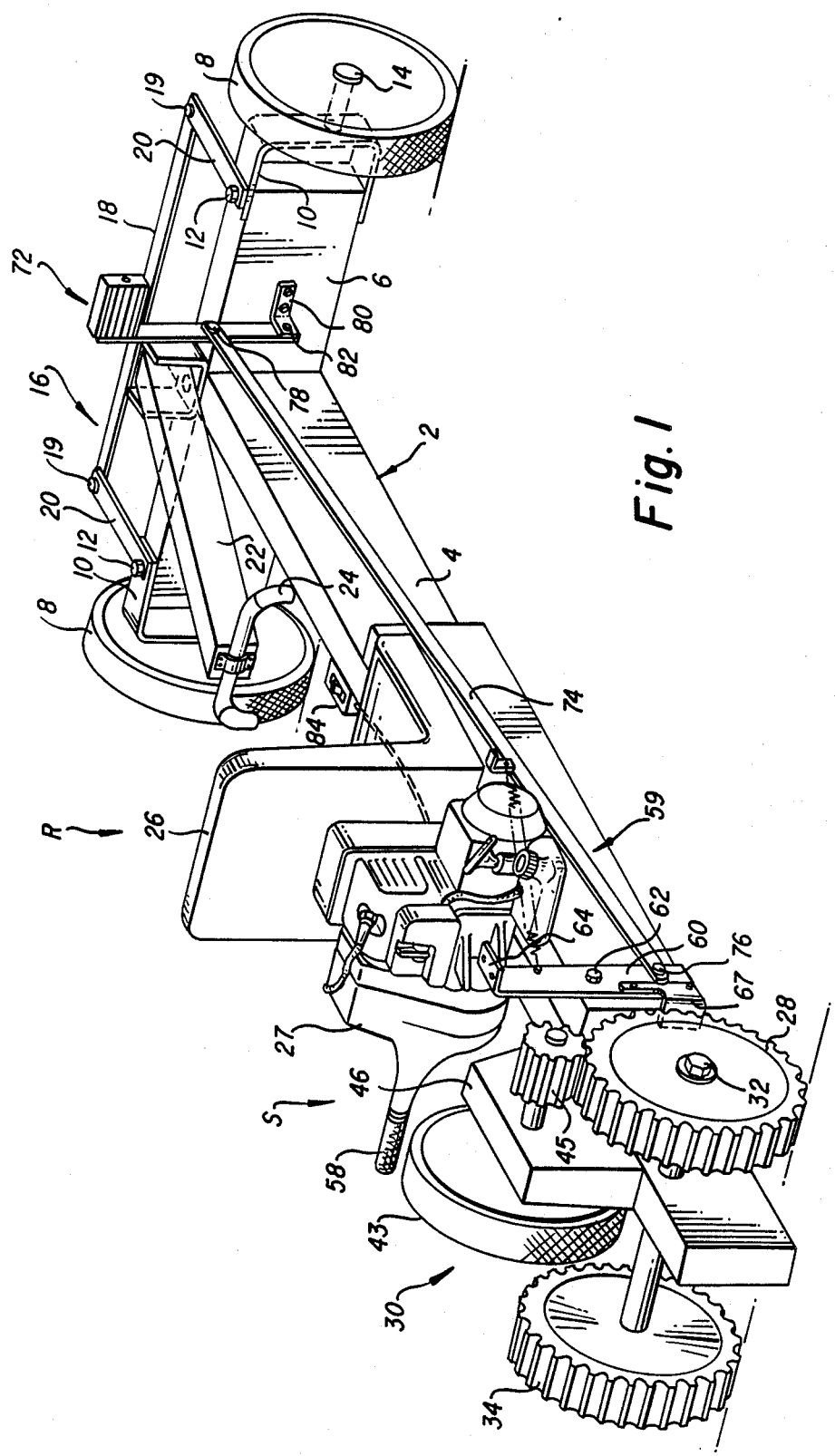
FIG. 1 is a perspective view of a vehicle according to the present invention, with an engine shown in exploded view relative to an engine mount.

A vehicle R according to the present invention includes a main frame 2. The frame 2 comprises a longitudinal member 4 and a transverse member 6 secured to the front end of the member 4. The main frame 2 is preferably made of two by four stock lumber, although other materials and size may be used.

A pair of ground-engaging front wheels 8 are pivotally secured to the opposite ends of the member 6 by means of a pair of U-shaped brackets 10. Each bracket 10 is pivotally secured to each end of the transverse member 6 by a pivot 12, thereby permitting each wheel 8 to pivot about its respective pivot 12. A shaft 14 is rigidly secured by weld or other suitable means (not shown) to each bracket 10 and rotatably supports each wheel 8.

A steering mechanism 16 allows proper steering of the wheels 8. The steering mechanism 16 includes an arm 18 disposed parallel to the transverse member 6, and a pair of connecting arms 20 each of which is pivotally connected to each end of the arm 18 by pivots 19 and rigidly connected by weld or other standard means (not shown) to respective brackets 10. The steering mechanism further includes a steering column 22 which is pivotally secured at its intermediate portion to the transverse member 6 by pivot 23 and at its forward end to the arm 18 by pivot 25, as best shown in FIG. 5. Handle 24 secured to the rear end of the steering column 22 provides a convenient way for a driver to operate the steering mechanism 16.

While it is disclosed that the front wheels 8 are used for steering, it should be understandable to a person skilled in the art that the rear wheels 28 and 34 can also be used. Also, while a steering column 22 is used for hand operation, it is understood that other means, such as foot manipulation, can be used to direct the wheels 8.

A seat 26 is secured by standard means (not shown) to an intermediate portion of the longitudinal member 4.

FIGS. 2, 3 and 4

A drive mechanism S is disposed adjacent the rear end of the longitudinal member 4 for driving the vehicle R, as best shown in FIG. 1. An engine 27 drives a rear ground engaging wheel 28 one end of an axle 32 which is secured transversely to a rear end portion of the longitudinal member 4. The wheel 28 preferably is 6.75 in. in diameter, but can be any size from minimum and maximum diameters of 5 in. and 12 in., respectively, for optimum gear reduction and proper ground clearance. A balance wheel 34 is preferably rotatably secured to the other end of the axle 32 and has the same diameter as the wheel 28. Spacers 36 and 38 disposed around the axle 32 between the wheels 28 and 34 and the longitudinal member 4, respectively, prevents each of the wheels 28 and 34 from scraping against the longitudinal member 4, as best shown in FIG. 4. The axle 32 is preferably a bolt with a threaded end 40 and a wing nut 42. A bearing sleeve (not shown) around the axle 32 for each of the wheels 28 and 34 are preferably used to reduce rotational friction. The wheels 28 and 34 are preferably 8 in. in diameter.

The engine 27 is preferably of the type used in lawn trimmers. It is generally lightweight, usually under 10 pounds, generates low torque at about 0.6 foot-pounds peak or less, has low horsepower, generally under 1 hp peak, and runs at high speed, operating between 3,000 and 10,000 RPM (revolutions per minute).

The torque converter 30 provides for increasing the available torque from the engine 27. The torque converter 30 includes a free wheel 43 rigidly secured to a geared wheel 45 by means of an axle 44 rotatably supported in a support block 46. The size of the free wheel 43 is preferably 8 in. in diameter, but can be any size in the range of 5 in. to 12 in. in diameter. The free wheel 43 preferably has a hard rubber thread to minimize wear. A bearing sleeve 48 disposed around the axle 44 and within the support block 46 advantageously reduces rotational friction. The geared wheel 45 and the free wheel 43 are preferably keyed to the axle 44 such that both wheels rotate at the same RPM. Spacers 50 and 52 disposed around the axle 44 advantageously maintains the free wheel 43 and the geared wheel 45 away from the support block 46, thereby preventing the wheels from scraping the support block 46. Also, the spacer 50 keeps the geared wheel 45 in proper alignment with the rear ground engaging wheel 28. The axle 44 is preferably a bolt with threaded end portion 54 and a nut 56. The geared wheel 45 is preferably in meshing engagement with the ground engaging wheel 28. It should be understood by a person skilled in the art that other means for effecting power transfer from the geared wheel 45 to the drive wheel 28 may be used, such as a friction drive, chain and sprocket arrangement, v-belt arrangement, or the like. Preferably, the geared wheel 45 and the drive wheel 28 have a gear ratio ranging from 1:1 to 3:1.

The engine 27 includes an output shaft directly driving a knurled wheel 58 which is frictionally engageable with the free wheel 43. The knurled wheel 58 is preferably ⅜ in. in diameter, but can be any size from minimum and maximum diameters of 0.25 in. and 2 in., respectively. It should be understood by a person skilled in the art that a proper knurl design will result in optimum power transmission with minimum wear. The knurled wheel 58 is preferably made of hard steel.

The engine 27 is secured to the longitudinal member 4 by an engine mount 59 for positioning the wheel 58 in frictional engagement with the free wheel 43. The engine mount 59 includes a pivot bracket 60 pivotally secured at its intermediate portion to the longitudinal member 4 at pivot 62. The pivot bracket 60 is disposed substantially vertically. A flange portion 64 at the top end of the pivot bracket 60 includes two holes 66 for securing the engine 27 to the flange portion 64 with bolt and nut combination (not shown) or other standard fastening means. The pivot bracket 60 therefore pivotally carries the engine 27 and permits the knurled wheel 58 to be positioned in engagement or disengagement with the free wheel 43. A brake plate 67 is attached to the bottom end of the pivot bracket 60 by means of fasteners 68. A spring 70 of sufficient size biases the brake plate 67 against the wheel 28 and normally maintains the knurled wheel 58 away from the free wheel 43. A control pedal 72 is connected to the pivot bracket 60 by means of a connecting bracket 74 pivotally connected at pivots 76 and 78 at each end thereof, as best shown in FIG. 1. The control pedal 72 is pivotally connected to the longitudinal member 6 with a right angle bracket 80 and pivot 82.

While a pivotable engine mount 59 is disclosed, it is understood by a person skilled in the art that a sliding type carriage which carries the engine 27 between engagement and disengagement with the free wheel 43 also will work.

The control pedal 72 is preferably used since a driver's legs are generally stronger than his or her arms, thereby permitting the driver to comfortably apply the required pressure for a long period of time during operation of the vehicle R. Also, foot pedals are used for power transmission acceleration control in cars and is therefore considered normal. Further, foot control of power transmission leaves the hands free for steering and engine speed control.

A throttle control 84 disposed on the longitudinal member 4 and preferably within easy reach of the driver is operably connected to the carburetion system of the engine 27 for speeding up or slowing down the engine RPM. The engine RPM can be either preset or controlled by the user through the throttle control 84. The throttle control 84 can also be remotely located away from the user. The engine 27 has a torque curve which is relatively constant through the operating speed range which allows for a preset maximum operating speed.

The vehicle R preferably weighs under 35 pounds, has an overall length of approximately 4 ft., and has a wheel base between the front wheels 8 of 2 ft. to 4 ft. for turning stability and convenient portability within a typical car trunk.

OPERATION

The engine 27 is started. The throttle is adjusted to provide the proper RPM. The brake plate 67 is normally engaged against the drive wheel 28 from the force of the spring 70 pulling the upper end of the pivot bracket 60. At the same time, the knurled wheel 58 is away and disengaged from the free wheel 43. A driver positions himself or herself in the seat 26 and holds the steering handle 24. To start moving, the driver depresses the control pedal 72 with his or her right foot, as in a normal car. This pedal action causes the connecting bracket 74 to pivot the pivot bracket 60, which then causes the brake plate 67 to move away from the drive wheel 28 while at the same time moves the knurled wheel 58 into friction engagement with the free wheel 43. The knurled wheel 58 rotates clockwise as viewed in FIG. 2. Since the available torque from the engine 27 is relatively constant with engine speed, the vehicle R can be started from rest at any operational engine speed.

The dimensions for the drive wheel 28 and the torque converter 30 and the settings for the engine speed are selected to provide a safe speed for the vehicle R. For example, with the radius of the drive wheel 28 between 0.1 ft. to 0.5 ft., the engine RPM at 7,000, and the total gear ratio between the speeds of the engine 27 and the drive wheel 28 in the range of 10:1 to 30:1, the speed of the vehicle R is expected to be in the range of 10 miles/hour to 25 miles/hour.

As the free wheel 43 starts to rotate counterclockwise, as viewed in FIG. 2, the geared wheel 45 rotates with it in the same direction, since both wheels are rigidly connected together through the axle 48. The geared wheel 45, in gearing engagement with the drive wheel 28, then causes the drive wheel 28 to rotate clock-wise, as viewed in FIG. 2, thereby propelling the vehicle R forwardly. The balance wheel 34 rotates freely, since it is not rigidly secured to the drive wheel 28. This contributes to stability during turning when the balance wheel 34 can rotate at a different rate than the drive wheel 28.

The driver must maintain pressure on the control pedal 72 to keep the vehicle R moving. As soon as he releases the control pedal 72, the spring 70 causes the pivot bracket 60 to move the engine 27 away from the free wheel 43 to thereby disengage the engine 27 therefrom, and to force the brake plate 67 against the drive wheel 28.

To modulate the speed of the vehicle R, the driver can adjust the RPM at the throttle control 84. He also can reduce his or her foot pressure on the control pedal 72 to cause slipping between the knurled wheel 58 and the free wheel 43, thus reducing power transfer. Further, he can completely release the control pedal 72, thereby causing the engine 27 to disengage from the free wheel 43 and the brake plate 67 to contact the drive wheel 28, as discussed above. It is seen that a clutch is not required for smooth power transition.

To turn the vehicle R left or right, the driver simply moves the steering column 22 left or right as desired, causing the arm 18 to move left or right, thereby causing the U-brackets 10 and the wheels 8 connected thereto to turn left or right, as best shown in FIG. 5.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A vehicle, comprising:
   (a) a main frame;
   a pair of front wheels and at least a rear wheel operably associated with said frame for engagement with the ground;
   (c) means for steering the vehicle;
   (d) a seat associated with said frame for an operator;
   (e) an engine including a drive shaft;
   (f) means for mounting said engine to said main frame;
   (g) torque converter operably associated with said drive shaft and said at least rear wheel;
   (h) said mounting means including a first position whereby said drive shaft is in driving engagement with said torque converter and a second position whereby said drive shaft is in disengagement from said torque converter;
   (i) means operably associated with said mounting means for stopping the vehicle and having operative and non-operative positions such that when said stopping means is in said non-operative position, said drive shaft is in said first position and when said stopping means is in said operative position, said drive shaft is in said second position;
   (j) said mounting means including a bracket pivotally secured to said frame;
   (k) said bracket including first and second ends;
   (l) said first end being operably associated with said engine, thereby permitting said engine and said drive shaft to move between said first and second positions; and
   (m) said bracket second end including a brake plate normally engaged against said at least rear wheel.

2. A vehicle as in claim 1, wherein:
   (a) said mounting means includes a spring operably associated with said bracket for biasing said drive shaft away from said torque converter.

3. A vehicle as in claim 1, wherein:
   (a) said mounting means includes a pedal operably associated with said bracket for selectively moving said bracket between said first and second positions, thereby engaging and disengaging said drive shaft, respectively, relative to said torque converter.

4. A vehicle as in claim 1, wherein:
   (a) said torque converter includes first and second wheels operably associated with each other;
   (b) said first wheel is engageable with said drive shaft; and
   (c) said second wheel is operably associated with said at least rear wheel.

5. A vehicle as in claim 4, wherein:
   (a) said drive shaft, said first and second wheels, and said at least rear wheel has a gear ratio ranging from 10:1 to 30:1.

6. A vehicle as in claim 4, wherein:
   (a) said second wheel and said at least rear wheel are geared; and
   (b) said second wheel is in gearing engagement with said at least rear wheel.

7. A vehicle as in claim 1, wherein:
   (a) said drive shaft is knurled;
   (b) said torque converter includes a threaded wheel; and
   (c) said drive shaft is engageable with said threaded wheel.

8. A vehicle as in claim 1, wherein:
   (a) said engine is mounted behind said seat.

9. A vehicle as in claim 8, wherein:
   (a) said engine is mounted adjacent the rear portion of the vehicle.

10. A vehicle as in claim 1, and further comprising:
    (a) another rear wheel.

11. A vehicle as in claim 1, wherein:
    (a) said frame includes a longitudinal member and a transverse member secured to a front portion of said longitudinal member.

12. A vehicle as in claim 11, wherein;
    (a) each of said pair of front wheels is pivotally secured to each opposite end of said transverse member.

13. A drive mechanism for a vehicle, comprising:
    (a) an engine having an output shaft;
    (b) means for mounting said engine to the vehicle;
    (c) torque converter operably associated with said drive shaft and a drive wheel of the vehicle;
    (d) said mounting means including a first position whereby said drive shaft is in driving engagement with said torque converter and a second position whereby said drive shaft is in disengagement from said torque converter;

(e) means operably associated with said mounting means for stopping the vehicle and having operative and non-operative positions such that when said stopping means is in said non-operative position, said drive shaft is in said first position and when said stopping means is in said operative position, said drive shaft is in said second position;

(f) said mounting means including a bracket pivotally secured to the vehicle;

(g) said bracket including first and second ends;

(h) said first end being operably associated with said engine, thereby permitting said engine and said drive shaft to move between said first and second positions; and (i) said bracket second end including a brake plate normally engaged against a ground engaging wheel of the vehicle.

14. A vehicle as in claim 13, wherein:

(a) said mounting means includes a spring operably associated with said bracket for biasing said drive shaft away from said torque converter; and (b) said mounting means includes a pedal operably associated with said bracket for selectively moving said bracket between said first and second positions, thereby engaging and disengaging, respectively, said drive shaft relative to said torque converter.

15. A vehicle as in claim 13, wherein:

(a) said torque converter includes first and second wheels operably associated with each other;

(b) said first wheel is engageable with said drive shaft;

(c) said second wheel is operably associated with a rear wheel of the vehicle; and (d) said drive shaft, said first and second wheels, and the rear wheel of the vehicle has a gear ratio ranging from 10:1 to 30:1.

16. A vehicle as in claim 13, wherein:

(a) said drive shaft is knurled:

(b) said torque converter includes a threaded wheel; and (c) said drive shaft is engageable with said threaded wheel.

* * * * *